US007068208B2

(12) United States Patent
Wu

(10) Patent No.: US 7,068,208 B2
(45) Date of Patent: Jun. 27, 2006

(54) REMOTE CONTROLLED CABINET

(76) Inventor: Hsu-Chu Wu, P.O. Box No. 6-57, Junghe, Taipei 235 (TW)

( * ) Notice: Subject to any disclaimer, the term of this patent is extended or adjusted under 35 U.S.C. 154(b) by 445 days.

(21) Appl. No.: 10/461,467

(22) Filed: Jun. 16, 2003

(65) Prior Publication Data

US 2004/0252045 A1 Dec. 16, 2004

(51) Int. Cl.
*G08C 19/12* (2006.01)
*H04L 17/02* (2006.01)

(52) U.S. Cl. ....................... 341/176; 312/218; 312/228

(58) Field of Classification Search ................ 341/176; 312/215–234, 21–20, 334.1–334.7
See application file for complete search history.

(56) References Cited

U.S. PATENT DOCUMENTS 3,680,936 A * 8/1972 Backhaus ................... 312/7.1
6,637,842 B1 * 10/2003 Elm et al. ................... 312/217
6,719,383 B1 * 4/2004 Elick et al. ................. 312/228
6,902,243 B1 * 6/2005 Bober ........................ 312/306
2003/0136595 A1 * 7/2003 Lacy ......................... 180/89.1
2004/0108795 A1 * 6/2004 Meek et al. ................ 312/218

* cited by examiner

*Primary Examiner*—Timothy Edwards, Jr.

(57) ABSTRACT

A remote controlled cabinet includes an inner containment space and at least a retractable cabinet door having at least a toothed rail mounted in the interior of the cabinet thereof and at least a set of remote control switch driver having a remote control circuit therein. The remote control switch driver consists of gears which synchronize with a toothed rail teeth and a pulling arm connecting to the retractable cabinet door. Through a remote controller the remote control switch driver be moved along the toothed rail. By transmitting push-out or pull-in signals to the remote control switch driver through the remote control, the pulling arm and gears of the remote control switch drivers can be driven thereby opening and closing the retractable door from the cabinet body.

19 Claims, 4 Drawing Sheets

REMOTE CONTROLLED CABINET

BACKGROUND OF THE INVENTION a) Field of the Invention

The invention herein relates to a remote controlled cabinet, more specifically a type of cabinet that slides back and forth on a toothed rail and driven by a remote controlled driver to open and close. It is of tremendous value on industrial applications.

b) Description of the Prior Art

The market at present has yet seen a remote controlled retractable cabinet with doors that open and close automatically, as for the conventional cabinets that are opened and closed manually. When the doors are opened, they are lifted and turned outwards to the two sides in front of the cabinet, not only do they occupy definite spaces, but also hinder the accessibility of the user and block the sight. If the cabinet is made of glass, more often the cabinet doors are broken as a result of impact from careless maneuvers when opening and closing. Moreover; the cabinet doors and the cabinet body are connected by hinges which not only have to support the weight of the cabinet doors, but also undertake the excess push and pulls of user's hands. As a result of unevenly applied force and endured spinning, the hinges are often worn and damaged. Secondly, to increase the anti-theft and security functions in cabinets, such as in cabinets used for storage of valuable items or toxic substances, or cabinets used to avoid the accessibility of children, security locks often need to be mounted on the cabinet doors, resulting in the inconvenience for accessibility. In order to solve the problem of said conventional hand brake device, having done long-term research and experiments, the inventor has finally developed and designed the present invention, a remote controlled cabinet.

SUMMARY OF THE INVENTION

The innovation of a remote controlled cabinet, more specifically a cabinet with a remote control switch driver that moves back and forth on a toothed rail thereby driving the retractable cabinet doors in opening and closing status.

The primary objective of the present invention is to provide a remote controlled cabinet having a remote controller that transmits opening and closing signals to a remote control switch driver thereby controlling a pulling arm and driving the retractable doors to open or close.

Another objective of the invention is to provide a remote controlled cabinet, having a retractable door that retracts to the interior of the cabinet without occupying extra space after the cabinet door being opened through a remote controller.

Yet another objective of the invention is to provide a remote controlled cabinet with the retractable door being opened through a remote controller and thereby ensuring anti-theft and security effects.

To enable a further understanding of the said objectives and the technological methods of the invention herein, the brief description of the drawings below is followed by the detailed description of the preferred embodiments.

DESCRIPTION OF THE PREFERRED EMBODIMENTS

Figure 1:
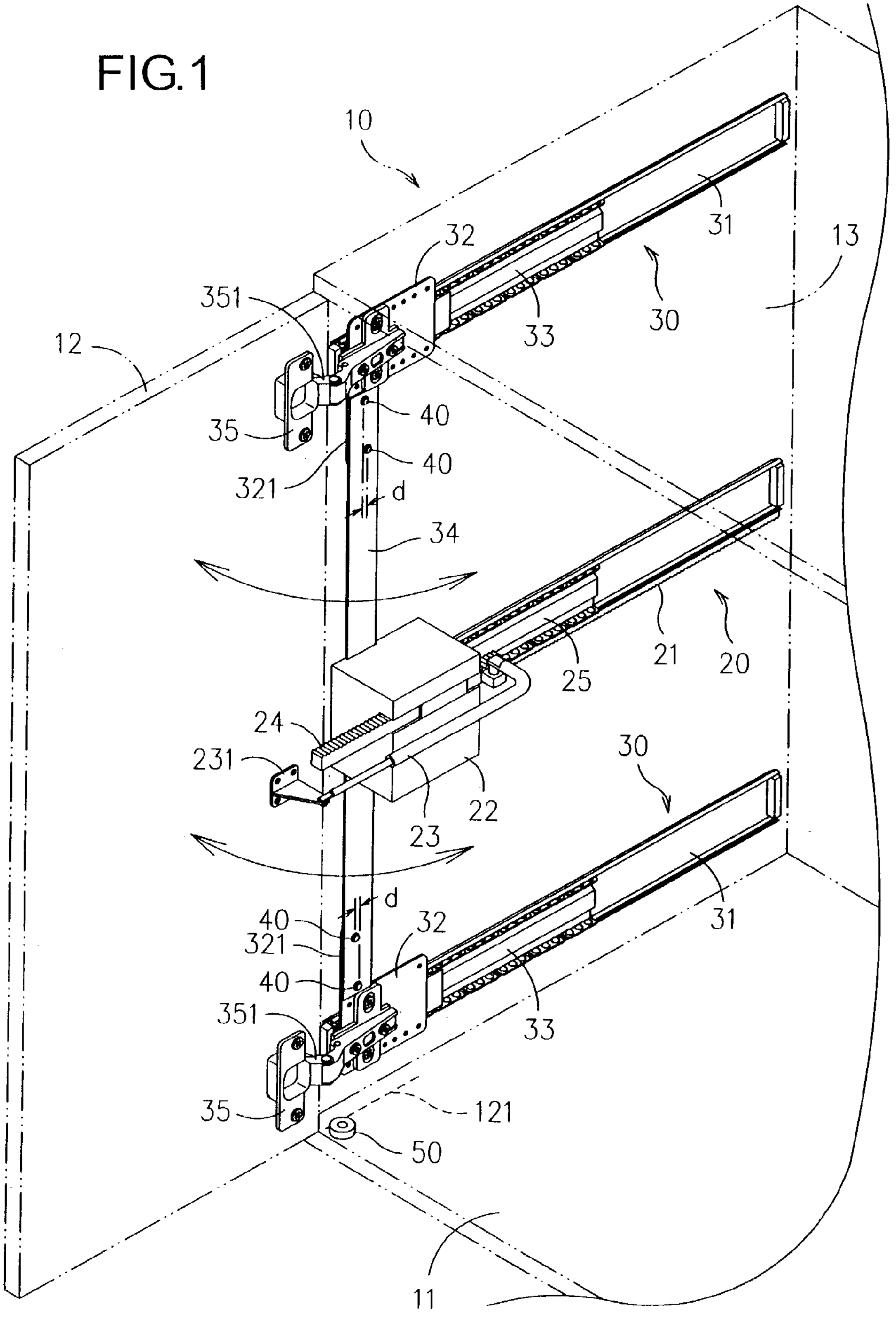
FIG. 1 is a perspective schematic view of an exemplary preferred embodiment of the present invention.

Referring to FIG. 1, the invention of a type of remote controlled cabinet, which includes:

a cabinet (10) having a containment space (11) and at least a retractable door (12); the feature of the present invention is that a cabinet (10) has a remote control device (20), the remote control device (20) further includes:

at least a toothed rail (21), installed on the interior of cabinet (10); and, at least a remote control switch driver (22), wherein a remote control circuit (not shown in the drawings) is a frequency transmitting circuit. The remote control switch driver (22) contains gears (not shown in the drawings) that synchronize with toothed rail (21), the remote control switch driver (22) also has a pulling arm (23) connected with retractable door (12), through the remote controller (not shown in drawings); the remote control switch driver (22) can move on toothed rail (21). The remote control switch driver (22) contains a small grooved rail (24), which is electrically connected with the pulling arm (23); thereby driving the pulling arm (23).

Figure 2:
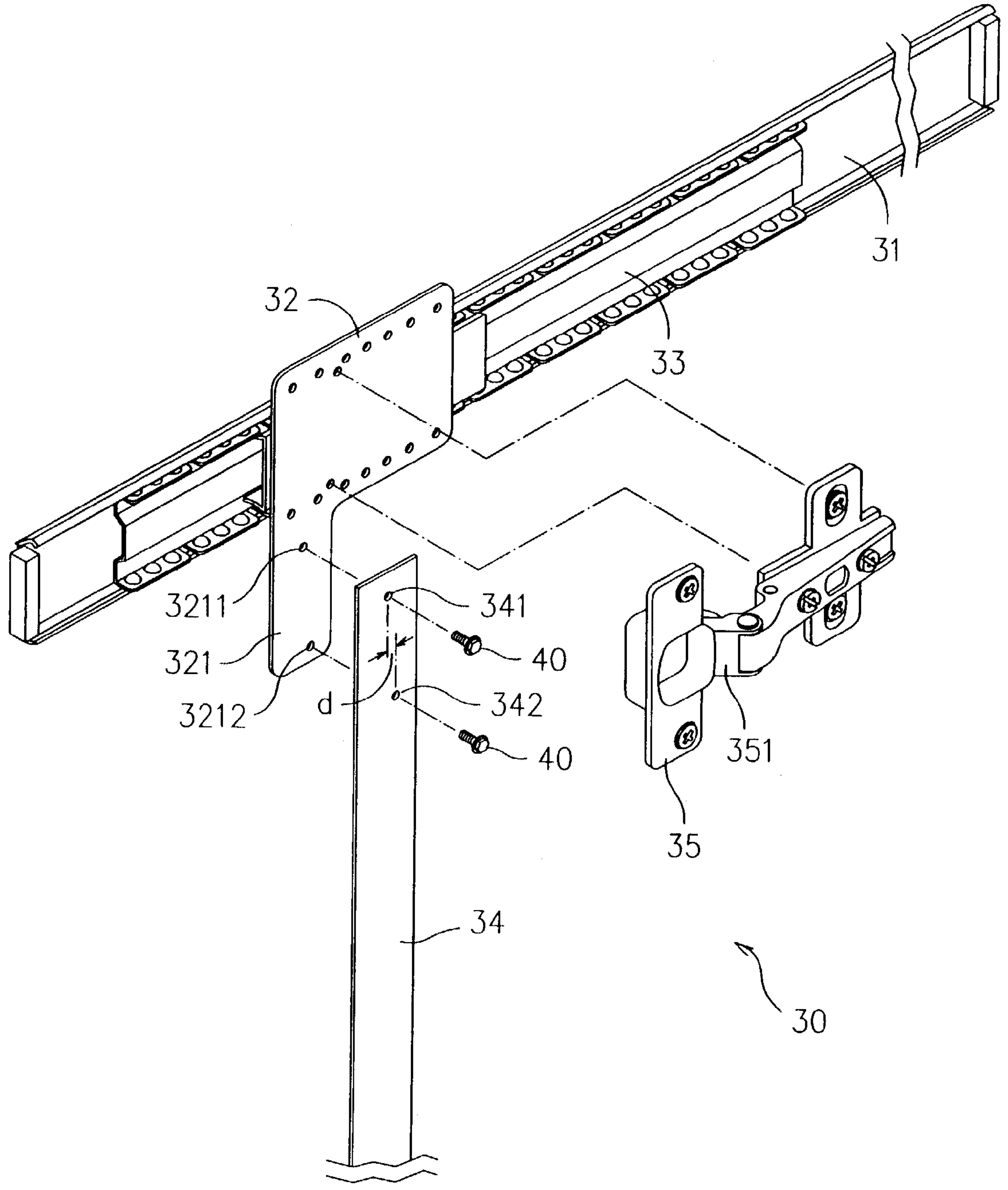
FIG. 2 is an exploded view of an exemplary preferred embodiment according to the present invention.

Referring to FIG. 2, the remote control switch driver (22) is in link with a sliding rail device (30), wherein at least two sets of sliding rails (31) each on the upper and the lower of the perpendicular inner side wall (13) with the sliding rail (31) and toothed rail (21) both extending in the same direction. The sliding rail (31) can also be applied by installing two neighboring sidewalls of the cabinet (10) to drive two retractable doors (12) simultaneously. This exemplary embodiment herein illustrates only a retractable door for explanation.

On the sliding rail (31) is disported a sliding piece (32) and further, a roller device (33) is installed between sliding rail (31) and sliding piece (32) to enable smooth sliding of sliding piece (32) along with the sliding rail (31). The sliding piece (32) has a projecting portion (321) which is screw fastened by a link shaft (34) in conjunction with of the sliding piece (32). The feature of the present invention is that the corresponding upper and lower screw holes (341), (342), (3211), (3212) disposed on the link shaft (32) and sliding piece (34) are at eccentric measurement (d) with each other, thereby avoiding possible tipping out of retractable door (12) due to gravitational pull force.

On the sliding piece (32) there sets a hidden hinge (35) connecting the retractable door (12), the hidden hinge (35) contains a spring leaf (351) whereby elastic buffering is provided for the retractable door (12) being opened and closed.

The toothed rail (21) is installed between the two upper and lower sliding rails (31) with the remote control switch driver (22) being connected to link shaft (34). Through the link shaft (34) the simultaneous sliding movement of the two sliding pieces (32) and the remote control switch driver (22) can be performed on sliding rail (31) and toothed rail (21). To increase smooth sliding of remote control switch driver (22) moves along the toothed rail (21), a roller device (25) is disposed between the remote control switch driver (22) and the toothed rail (21).

Figure 3A:
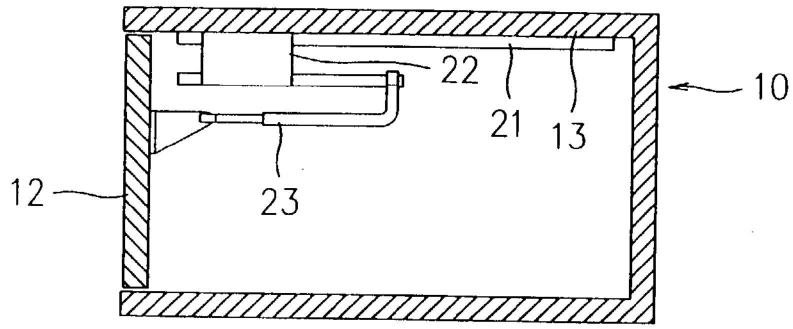
FIG. 3A to 3D are cross sectional views showing the retractable doors according to the present invention.
Figure 3B:
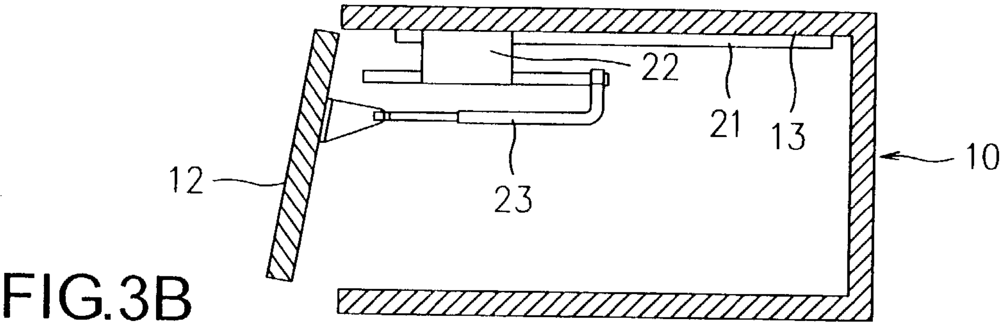
Figure 3C:
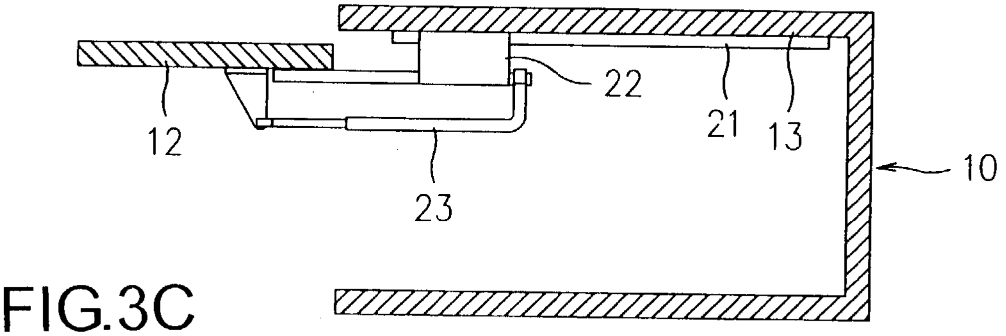
Figure 3D:
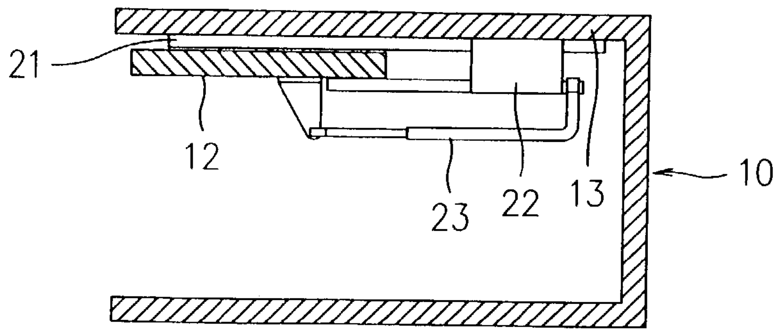
Figure 4A:
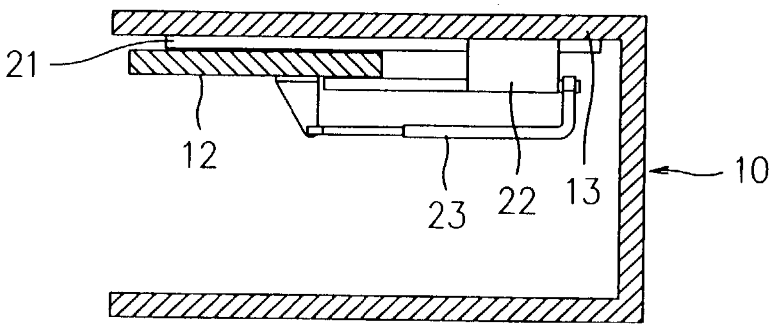
FIG. 4A to 4D are cross sectional views showing the push-out movement of the retractable doors according to the present invention.
Figure 4B:
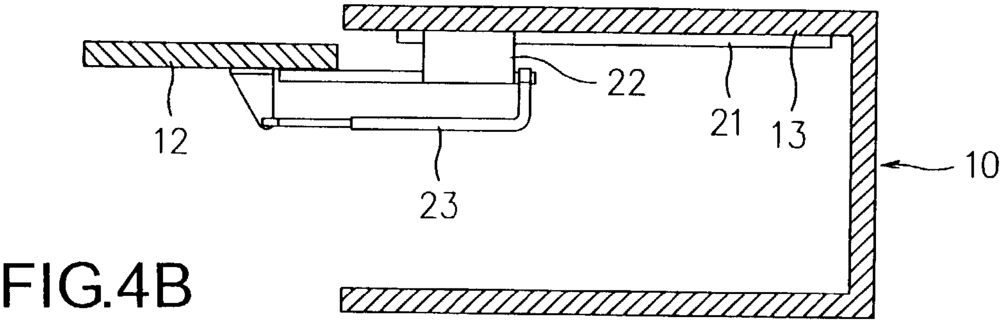
Figure 4C:
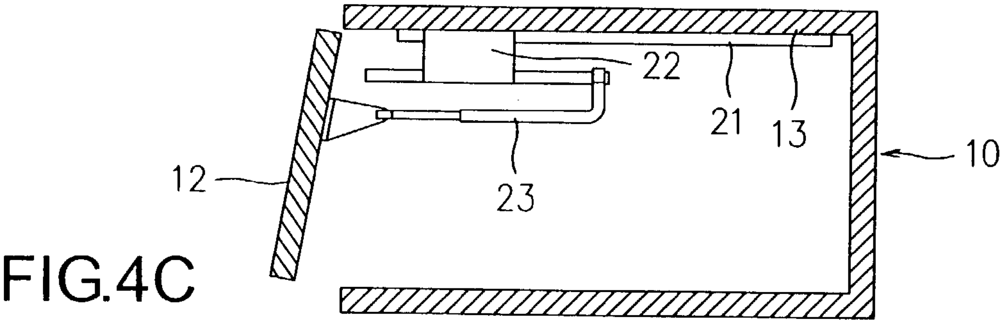
Figure 4D:
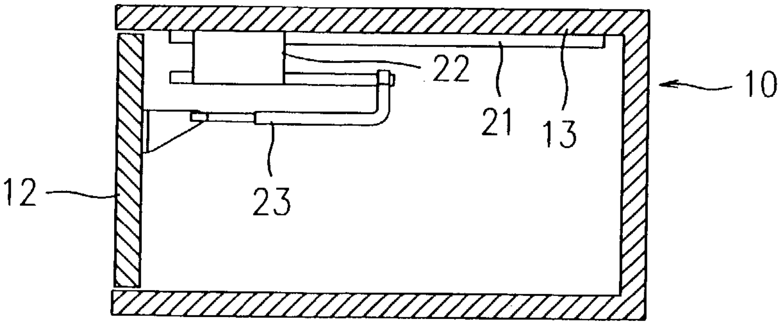

Through the above mentioned structure, the retractable cabinet door of the remote controlled cabinet according to the present invention provides the following steps:

1. Retraction steps: please refer to FIG. 3A to 3D, the retractable door (12) of cabinet (10) is in a shut condition. The refraction steps include:
   - (a) As shown in FIG. 3A, a remote controller (not shown in the drawings) transmit retracting signal to the remote control driver (22);
   - (b) As shown in FIG. 3B the pulling arm (23) of the remote control driver (22) first push out the retractable door (12) to an appropriate distance, ten the pulling arm (23) correspond wit the leaf spring (351) (see FIG. 1) of the hidden hinge (35) to turn open the retractable door (12). The retractable door (12) can be aligned paralleled to the inner sidewall (13) with the mounted tooted rail (21);
   - (c) As shown in FIG. 3C, the remote control switch driver (22) is driven by gears and moves toward inside of the cabinet (10) along with the toothed rail (21) and simultaneously bringing retractable door (12) inside the cabinet (10);
   - (d) As shown in FIG. 3D when the gears of the remote control switch driver (22) move to an appropriate inner end of the toothed rail (21), the remote control circuit (not shown in the drawings) ends thereby finishing the retraction steps.
2. Push-out steps, please refer to FIG. 4A to FIG. 4C, the retractable door (12) is stored inside the cabinet (10). The push-out steps include:
   - (a) As shown in FIG. 4A, a remote controller (not shown in the drawings) transmits push-out signal to the remote control switch driver (12);
   - (b) As shown in FIG. 4B, the remote control switch driver (22) is driven by gears and moves outward along the toothed rail (21), simultaneously push-out the retractable door (12) outward of the cabinet (10). When the gears of the remote control switch driver (22) move the sliding rail (21) to an appropriate outward end, the retractable door (12) is completely outside of the cabinet (10), in parallel to the inner sidewall (13) with the mounted toothed rail (21);
   - (c) As shown in FIG. 4C, the pulling arm (23) of the remote control switch driver (22) first push the retractable cabinet door (12) outwards a few millimeters;
   - (d) As shown in FIG. 4D, the pulling arm (23) corresponds with the spring leaf (351) of the hidden hinge (35) to turn the cabinet door (12) in close status (see FIG. 1), to make the retractable cabinet door (12) perpendicular to the cabinet wall (13), the remote circuit off thereby finishing the push-out steps.

Referring again to FIG. 1, a roller wheel (50) can be disposed beside the route (121) corresponding to the retracting movement of retractable door (12) of the cabinet (10) thereby enabling smoothness of movement of retractable door (12).

What is required to be explained is, the purpose by using the remote control switch driver (22) in pushing and pulling the retractable door (12) out and in a few millimeters to provide an appropriate distance between retractable door (12) and the cabinet (10) before activating is whereby to avoid clashing and scratching between retractable door (12) and cabinet (10).

In summary of the above mentioned structure, the present invention has the following advantages:

1. By applying the remote controller to transmit opening or closing signals to the remote control switch driver in controlling the pulling arm thereby pushing-out or retracting the retractable cabinet door.
2. The retractable door can be retracted inside of the cabinet and does not occupy extra space after being opened by the remote controller.
3. The opening of the cabinet door is controlled by a remote controller, therefore providing anti-theft and security functions.
4. The force applied on opening and closing the retractable door is constant and even, making it more durable.

It is of course to be understood that the embodiment described herein is merely illustrative of the principles of the invention and that a wide variety of modifications thereto may be effected by persons skilled in the art without departing from the spirit and scope of the invention as set forth in the following claims.

The invention claimed is:

1. A remote controlled cabinet comprising:

a cabinet having an inner containment space and at least a retractable door, a remote controlled driving device having at least a toothed rail mounted in the interior of the cabinet; and at least a remote control switch driver; the remote control switch driver has gears that synchronize with a toothed rail, which is controlled by a remote control switch controller;

said remote switch controller transmits push-out or pull-in signals to the remote control switch driver thereby driving a pulling arm to retract or push-out the retractable door.

2. The remote controlled cabinet as set forth in claim 1, wherein the remote control switch driver having a small grooved rail electrically connected to the pulling arm; the pulling arm is thereby driven through the grooved rail.

3. The remote controlled cabinet as set forth in claim 1, wherein the pulling arm is disposed on the retractable cabinet door.

4. The remote controlled cabinet as set forth in claim 1, wherein a remote control switch driver is in link with a sliding rail device, the sliding rail device having at least a sliding rail is installed in the interior of the cabinet; the sliding rail and the toothed rail is extended in the same direction;

at least a sliding piece is disposed on the sliding rail thereby enabling to slide on the sliding rail;

at least a hidden hinge is equipped on the sliding piece and is connected to the retractable cabinet door;

at least a link shaft is disposed between the remote control driver and the sliding piece thereby enabling the remote control switch driver moves on the toothed rail and simultaneously move the sliding piece along the sliding rail by the link shaft.

5. The remote controlled cabinet as set forth in claim 4, wherein two sliding rails are disposed perpendicularly on the upper and lower portion of an inner side walls; the toothed rails are disposed between the upper and lower sliding rails; the sliding pieces disposed on the upper and the lower sliding rails are connected by the link shaft; the remote control switch driver is connected with the link shaft thereby enabling the two sliding pieces and the remote control driver to move simultaneously on the sliding rail and toothed rail.

6. The remote controlled cabinet as set forth in claim 4, wherein the sliding rails are disposed on two neighboring vertical sidewalls.

7. The remote controlled cabinet as set forth in claim 5, wherein the sliding rails are disposed on two neighboring vertical sidewalls.

8. The remote controlled cabinet as set forth in claim 4, wherein, the sliding piece having a projecting portion to secure the link shaft in connection with the sliding piece, and is characterized that screw holes are disposed on the link shaft and the sliding piece correspondingly, each are two eccentric holes at upper and lower portion thereby avoiding the tip-out of the retractable doors due to the pull force of gravity.

9. The remote controlled cabinet as set forth in claim 5, wherein, the sliding piece having a projecting portion to secure the link shaft in connection with the sliding piece, and is characterized that screw holes are disposed on the link shaft and the sliding piece correspondingly, each are two eccentric holes at upper and lower portion thereby avoiding the tip-out of the retractable doors due to the pull force of gravity.

10. The remote controlled cabinet as set forth in claim 4, wherein the hidden hinge having a spring leaf to provide buffering absorption with elasticity when the retractable door is being activated.

11. The remote controlled cabinet as set forth in claim 5, wherein the hidden hinge having a spring leaf to provide buffering absorption with elasticity when the retractable door is being activated.

12. The remote controlled cabinet as set forth in claim 4, wherein rollers are installed between the sliding rail and the sliding piece to enable smooth sliding.

13. The remote controlled cabinet as set forth in claim 5, wherein rollers are installed between the sliding rail and the sliding piece to enable smooth sliding.

14. The remote controlled cabinet as set forth in claim 1, roller wheels are disposed on the corresponding route of the retracting movement inside the retractable cabinet door to enable smooth opening and closing.

15. The remote controlled cabinet as set forth in claim 4, wherein a remote control driver is a frequency transmitting circuit.

16. The remote controlled cabinet as set forth in claim 5, wherein a remote control driver is a frequency transmitting circuit.

17. A remote controlled cabinet with the retractable cabinet door in closing status comprising the steps of:

(a) transmitting retracting signal to a remote control driver;

(b) pushing out the retractable door to an appropriate distance by the pulling arm of the remote control driver first, then the pulling arm correspond with the leaf of the hidden hinge to turn opening the retractable door such that the retractable door is being aligned in parallel to the inner side wall with the mounted toothed rail;

(c) driving gears of the remote control switch driver to enable the remote control switch driver moves toward inside of the cabinet along the toothed rail;

(d) finishing the retracting steps when the gears of the remote control switch driver move to an appropriate inner end of the toothed rail.

18. A remote controlled cabinet driving method with the retractable door stored inside the cabinet comprising the steps of:

(a) transmitting push-out signal to the remote control switch driver;

(b) driving gears of the remote control switch driver turn, the remote control switch driver moves outward along with the toothed rail and simultaneously push-out the retractable door outward; when the gears of the remote control switch driver move to an appropriate outward end, the retractable door is completely outside of the cabinet and is in parallel to the inner side wall thereof with the mounted toothed rail;

(c) pushing the retractable cabinet door outwards to an appropriate distance by the pulling arm of the remote control switch driver first;

(d) finishing the push-out steps by the pulling arm corresponds with the spring leaf of the hidden hinge to turn the cabinet door in close status, to make the retractable cabinet door perpendicular to the cabinet inner side wall, the remote circuit off.

19. The remote controlled cabinet as set forth in claim 1, wherein, the pulling arm disposed on the remote control switch driver push outward the retractable cabinet door at appropriate distance with a few millimeters when pushing-out and retracting of the retractable door.

* * * * *